United States Patent [19]

Ward et al.

[11] 4,135,242
[45] Jan. 16, 1979

[54] METHOD AND PROCESSOR HAVING BIT-ADDRESSABLE SCRATCH PAD MEMORY

[75] Inventors: William P. Ward, Poway; George B. Gillow, Bonita, both of Calif.

[73] Assignee: NCR Corporation, Dayton, Ohio

[21] Appl. No.: 849,048

[22] Filed: Nov. 7, 1977

[51] Int. Cl.² .............................................. G06F 13/00
[52] U.S. Cl. .................................................. 364/200
[58] Field of Search ........................ 364/200 MS File

[56] References Cited

U.S. PATENT DOCUMENTS

| | | | |
|---|---|---|---|
| 3,739,352 | 6/1973 | Packard | 364/200 |
| 4,032,895 | 6/1977 | Lanza et al. | 364/200 |

Primary Examiner—Raulfe B. Zache
Attorney, Agent, or Firm—J. T. Cavender; Stephen F. Jewett; Edward Dugas

[57] ABSTRACT

A microprogrammed processor having a bit-addressable scratch pad memory with variable length operands and a method of operation which increase processor operating speed, permit use of simpler interpretive firmware, and require a reduced amount of firmware memory than prior microprogrammed processors. Microinstructions each including a six bit op code field and first and second five bit address fields are stored in a high speed firmware memory. The two address fields are transferred to address inputs of a dual port descriptor memory which stores descriptors. Two descriptors are simultaneously fetched from locations of the descriptor memory determined by the first and second address fields of the microinstruction. Each descriptor includes an address field which defines a location of the least significant bit of an operand in the scratch pad memory and a length field which defines the length of that operand. Two operands or partial operands are fetched from the scratch pad memory and transferred to a rotator circuit which automatically aligns the fetched operand to an arithmetic and logic unit which performs iterative and fractional operations. The disclosed system and method permit interpretation of virtual instructions without utilizing additional firmware subroutines to accomplish shifting or masking of variable length operands or to perform iterative operations or carry safe operations involving the operands to align them with fixed width hardware of the processor.

26 Claims, 5 Drawing Figures

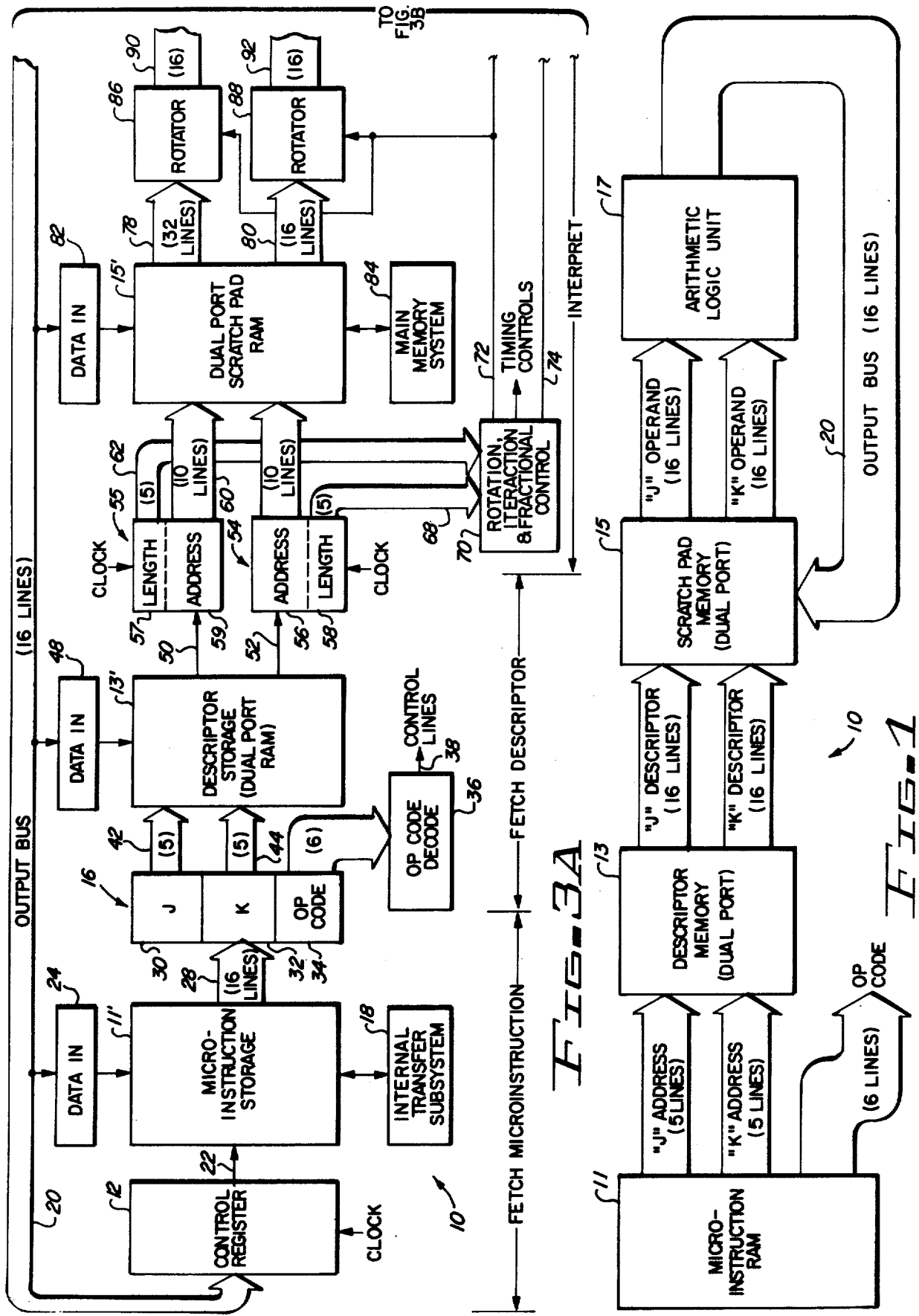

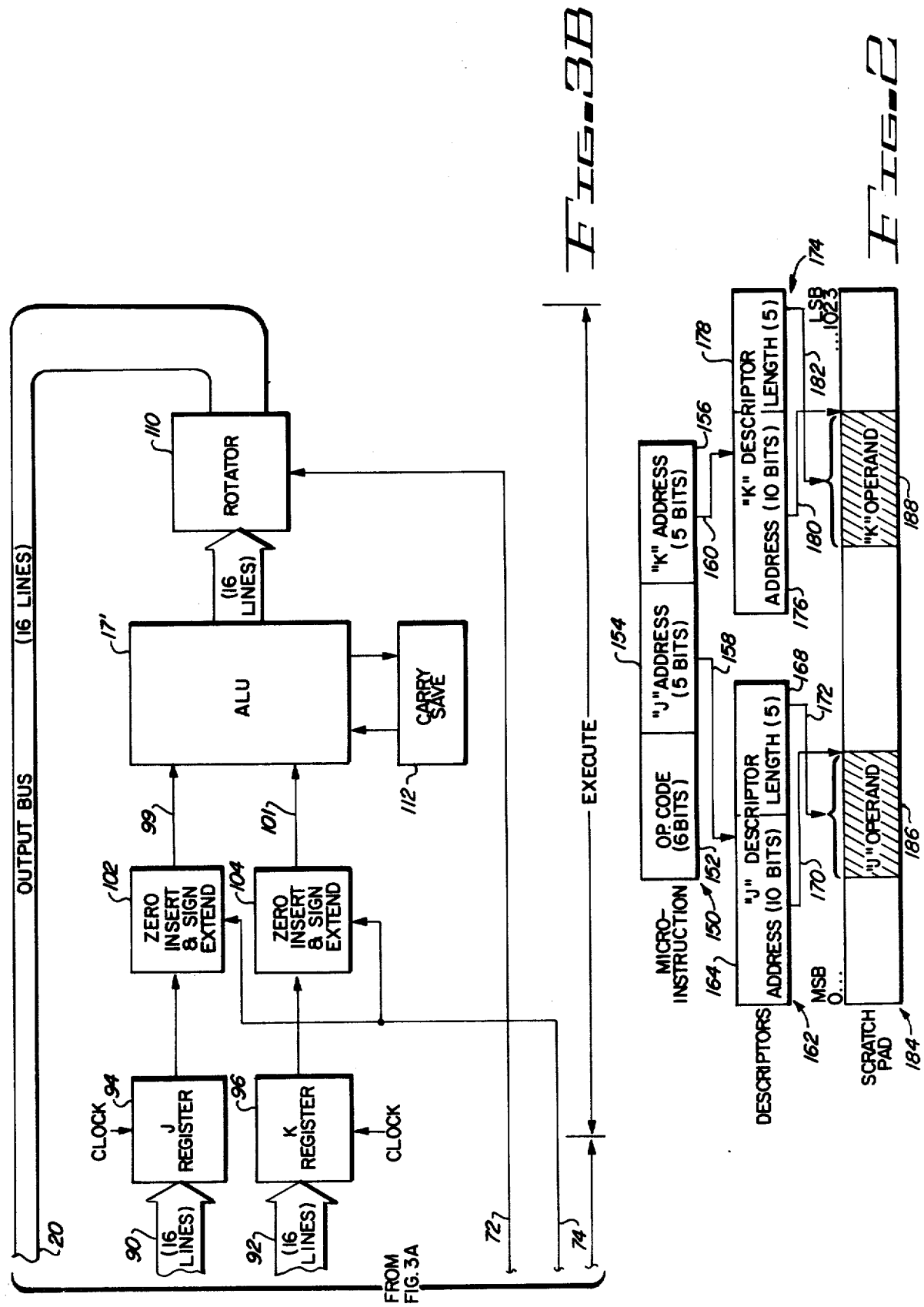

METHOD AND PROCESSOR HAVING BIT-ADDRESSABLE SCRATCH PAD MEMORY

BACKGROUND OF THE INVENTION

1. Field of the Invention

The invention relates to digital processors, and more particularly, to digital processors for rapidly interpreting multiple virtual instruction sets.

2. Description of the Prior Art

Most electronic digital processors include a number of registers, an arithmetic logic unit, a number of counters, and a number of data paths or data buses which are interconnected to permit efficient execution of stored program instructions. However, the registers, data paths, arithmetic logic unit, and counters are ordinarily of a fixed width. That is, they are capable of storing, transferring, counting, or operating upon only operands which have a fixed number of bits. Operands which have a fixed number of bits are referred to as fixed length operands. Known microprogrammed processors, which have only fixed width data paths, registers, etc., present programming problems if data manipulations are required which involve operands having fewer bits or more bits than the number of bits readily accommodated by the fixed width registers, counters, data paths, etc., of the processor. Additional programming steps are required in order to perform shifting and/or masking of operands which have different lengths than the fixed length of the processor's data paths, registers, etc. Additional programming steps are often also required to perform iterative operations and to save carry bits. Such additional shifting, masking, carry save, and iterative operation necessitate additional firmware memory to store additional microinstructions. Further, additional machine cycles are required to execute the microinstruction subroutines necessary to perform the above shifting, masking, etc., operations. As will be shown hereinafter, the above constraints substantially increase the burden on the firmware programmer for processors which are microprogrammed to interpret multiple virtual instruction sets which have operands of different lengths than the fixed width data paths and fixed width registers of the processor.

Microprogrammed digital processors may be programmed to interpret multiple virtual instruction sets and to "emulate" one or more foreign computers, or target computers. In other words, such microprogrammed processors may be programmed to interpret and process user programs written for various other computers. Such programs may be written in different programming languages which have various formats in which the op codes, address fields, data fields, etc., have different lengths which are incompatible with the fixed widths of the registers, data paths, and execution units of the processor. Such processors are ordinarily microprogrammed machines which must be programmed at the firmware level to be able to efficiently execute the above programs written in the various user programming languages. In certain instances it may be highly desirable that programs initially written for one computer system do not have to be rewritten at substantial expense for another computer system. The user programs for such microprogrammed computers are written using high level languages such as Fortran, Cobol, etc. The computer's compiler then compiles a program of initial instructions. The virtual instructions, however, are not decoded by the computer hardware, but instead are interpreted by various firmware subroutines written from microinstructions. The microinstructions have op codes which are decoded to produce control signals which directly control the operation of the processor hardware. The term "firmware" refers to instructions or groups of instructions which are used to interpret the virtual instructions. Virtual instructions are instructions which are not directly executed by processor hardware. Instead, they are "interpreted" by firmware microinstructions.

A firmware program which is used to interpret a program written for a foreign machine is called an emulator. If the languages which the emulator program is designed to interpret are substantially different in format from the formats accommodated by the processor hardware, the emulator programs may be very lengthy and unwieldy. The cost of the firmware programming effort in such instances may be very high. The firmware programming effort for a microprogrammed processor capable of interpreting multiple virtual instruction sets is a substantial part of the total effort of developing such a processor. For example, for a machine which interprets five virtual instruction sets (such as virtual instruction sets generated Fortran, Cobol, etc., compilers), it is necessary to develop five different sets of interpretive firmware, one for interpreting each virtual instruction set. The necessity of utilizing additional microinstruction subroutines for each of the virtual instructions for each of the five virtual instruction sets at the firmware level to shift and/or mask or save carries of or perform iterative operations on every operand to make it compatible with the fixed width hardware greatly increases the burden on the firmware programmer. Thus, the programmer writing the emulator program has to be constantly concerned with the fixed width character of the processor hardware. He has to write additional firmware subroutines in order to manipulate each operand or field of a virtual instruction into a format such that it is of suitable width and is properly aligned to be compatible with the machine hardware. Further, the amount of high speed microinstruction storage memory required is substantially increased. The physical size of the firmware storage unit, which is ordinarily a relatively expensive, high speed random access memory, has necessarily been high for such processors. This is because increases in the physical size of a high speed memory inevitably increases the access time of the memory because of the concomitant increase in the duration of transmission line delays, which are in turn due to the increase in the lengths of the transmission lines necessitated by the increases in physical size. Further, the overall speed of execution of virtual instructions having formats incompatible with the processor hardware is decreased. This is because a relatively large number of processor machine cycles are required in order to shift and mask or save carriers, etc., of the various fields of the virtual instructions and data to convert them into formats which are compatible with the processor hardware. In short, the overall system cost in terms of great firmware programming development effort, the large amount of firmware storage, and the large number of required machine cycles to execute the above microinstruction subroutines has been substantial for systems capable of processing multiple virtual programs.

Although certain known microprogrammed processors have been designed having the capability of storing instructions with variable length operands in main memory, such processors have had fixed width internal data paths, registers, counters, arithmetic logic units, etc. For example, see the processor described in U.S. Pat. No. 3,739,352 entitled "Variable Word Width Processor Control" by R. E. Packard, issued June 12, 1973. Such processors have nevertheless required shifting, masking, carry save, and iterative operations performed by means of firmware subroutines in order to convert the format of such variable length operands fetched from main memory into formats compatible with the processor hardware. The main achievement of such machines has been to permit increased code compaction in main memory and auxiliary storage, thereby reducing the costs of such memory and auxiliary storage. However, such machines can only achieve such code compaction for instruction sets in which the instructions are bit-addressable at the main memory level.

SUMMARY OF THE INVENTION

In view of the problems of the prior art, it is an object of the invention to provide a microprogrammed processor capable of more efficiently interpreting one or more virtual instructions sets than prior art processors.

It is another object of the invention to provide a microprogrammed processor for which the firmware programmer's burden is substantially reduced.

It is another object of the invention to provide a microprogrammed processor for which it is not necessary to utilize microinstruction subroutines to shift and/or mask, save carriers, of or perform iterative operations on operands of various lengths in order to align them with or accommodate them to fixed width data paths of the processor.

It is another object of the invention to provide a microprogrammed processor which requires substantially fewer microinstruction memory locations than is required for presently available microprogrammed processors of comparable processing capability.

It is another object of the invention to provide a very flexible microprogrammed processor.

It is another object of the invention to provide a microprogrammed processor capable of more efficiently emulating one or more virtual instruction sets than known processors.

Briefly described, the disclosed and presently preferred embodiment of the invention is a processor which is capable of efficiently interpreting multiple virtual instruction sets. The improved performance is achieved primarily by means of the combination of a descriptor-driven bit-addressable scratch pad memory with rotator logic circuitry which automatically aligns fetched operands with an arithmetic and logic unit. Microinstructions are stored in a high speed microinstruction storage unit. The microinstruction format includes first and second address fields and an op code field. The first and second address fields are utilized to access a dual port descriptor memory. The first address field defines locations of descriptors referred to as "J" descriptors which are stored in the descriptor memory. The second address field defines locations of descriptors referred to as "K" which are stored in the descriptor memory.

A "J" descriptor and a "K" descriptor are simultaneously fetched by a microinstruction. The fetched "J" descriptor and "K" descriptor are then utilized to simultaneously fetch two variable length operands stored in the bit addressable scratch pad memory. The scratch pad memory is a dual port memory which consists of first and second identical sections which contain identical information, each containing both of the two variable length operands. Each "J" descriptor contains an address field referred to as a "J" address field and a length field referred to as a "J" length field. The "J" address field defines the location of the least significant bit of a "J" operand stored in the scratch pad memory. The "J" length field defines the number of bits of the "J" operand. Similarly, the "K" descriptor contains a "K" address field and a "K" length field which respectively define a least significant bit of and a number of bits of a "K" operand stored in the scratch pad memory. Thus, the interpretive firmware for the processor is very flexible because two operands, each of any selected length and beginning at any selected bit position, may be fetched from the scratch pad memory by means of a single microinstruction of fixed length. No additional microinstructions are required to align the fetched "J" and "K" variable length operands to the arithmetic and logic unit, as would be required in prior microprogrammed machines. Each of the sections of the scratch pad memory is physically split up into even and odd sections. This permits simultaneous fetching of two adjacent groups of bits which together contain the addressed operand or a partial operand thereof. Rotator logic circuitry is utilized to accomplish the aligning of the fetched operands to the inputs of the arithmetic and logic unit. The rotator logic circuitry is controlled by control logic circuitry. The logic control circuitry decodes the descriptor address fields and length fields to produce control signals which enable the rotator logic circuitry to properly align the fetched operands. The arithmetic and logic circuit and the control logic circuitry operate to perform fractional operations on operands which are shorter than the fixed width data paths and also to perform iterative operations on operands which are longer than the fixed width data paths.

BRIEF DESCRIPTION OF THE DRAWINGS

FIG. 1 is a detailed block diagram of a processor which is a presently preferred embodiment of the invention.

FIG. 2 is a diagram illustrating the formats of certain firmware instructions, descriptors, and scratch pad operands utilized during operation of the processor of FIG. 1.

FIGS. 3A and 3B constitute a more detailed diagram of one port of the dual port scratch pad random access memory of FIG. 1.

DESCRIPTION OF THE INVENTION

Figure 4:
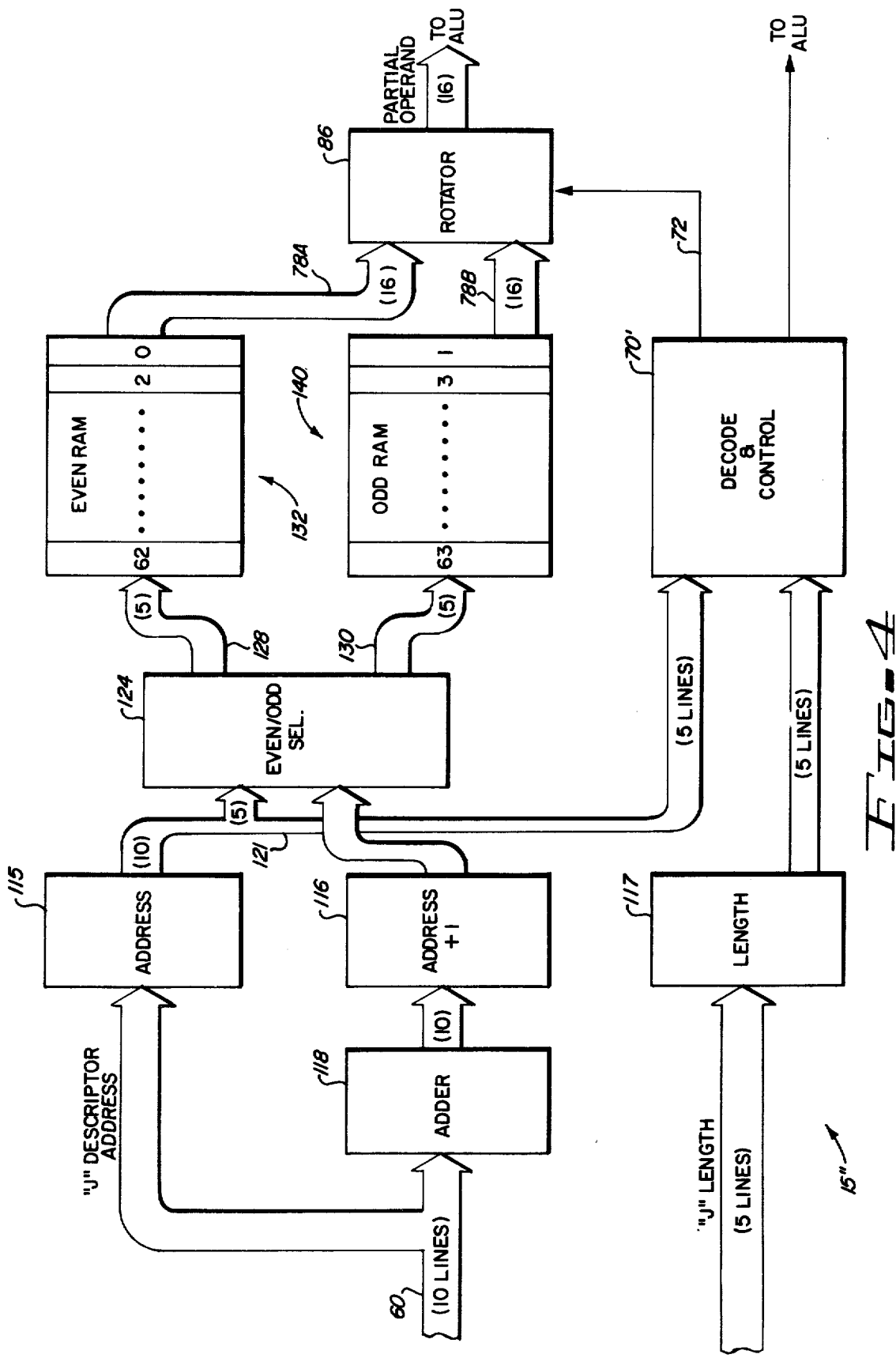
FIG. 4 is a detailed block diagram of part of the scratch pad random access memory section of FIGS. 1, 3A and 3B.

Processor 10 of FIG. 1 is a microprogrammed machine. It performs normal data processing functions, executes instructions, fetches data and instructions from main memory and writes information into main memory. Its instruction set includes instructions such as arithmetic, logic, compare, move, jump, and shift instructions. It is capable of executing user code, software code, and operating system code or firmware. Processor 10 includes microinstruction storage unit 11, dual port descriptor memory 13, dual port scratch pad memory 15, and arithmetic and logic unit 17. This processor may be operated as a subsystem of a larger data processing system. Depending upon the microinstructions executed, processor 10 may function as a high level language interpreter, or it may function as an emulator of a foreign processor and may dynamically switch between the interpretation of different high level languages.

Microinstruction storage unit 11 contains microinstruction subroutines which are utilized to analyze and interpret virtual instructions compiled from the main user program. The format of the microinstructions is shown by reference numeral 150 in FIG. 2. Each microinstruction includes a six bit op code field 152, a five bit "J" address field 154, and a five bit "K" address field 156. The five bit "J" address field is used to select one of 32 descriptors stored in one half of dual port descriptor memory 13 and "K" address field 156 is used to simultaneously select one of the same 32 descriptors stored in the other half of dual port descriptor memory 13.

It should be noted that the descriptor memory 13 is a dual port memory. A dual port memory is a memory which may have two of its addressable word locations simultaneously accessed. In order to implement the above dual port descriptor memory utilizing commercially available integrated circuit random access memories, it was necessary to provide two duplicate halves for the dual port descriptor memory (since no integrated circuit dual port random access memories are presently available). Identical information is contained in each half of the dual port descriptor memory as implemented herein, in order to accomplish simultaneous fetching of two descriptors from the descriptor memory. (Similarly, identical information is contained in both halves of the subsequently described scratch pad memory 15, which is also a dual port memory, to permit simultaneous fetching of two adjacent operands.)

The format of the descriptors stored in descriptor memory 13 is shown in FIG. 2 by descriptors 162 and 174. Descriptor 162 includes a ten bit address field 164 and a five bit length field 168; descriptor 174 includes a ten bit address field 176 and a five bit length field 178. As a practical matter, an additional bit could be included to indicate bit addressing or byte addressing of the scratch pad, as explained later, or to indicate some other useful function, such as determining the kind of data, i.e., signed or unsigned binary, BCD, etc. Line 158 in FIG. 2 indicates that the five bit "J" address field 154 of microinstruction 150 is used to select "J" descriptor 162, while line 160 indicates that "K" address field 156 of microinstruction 150 is used to select "K" descriptor 174.

Dual port scratch pad memory 15 may be regarded as a continuous bit container which contains 1,024 bits which are individually addressable. Its detailed structure will be described in detail later in conjunction with FIG. 4. Scratch pad memory 15 contains operands which have been written in duplicate into scratch pad memory 15 from main memory. (The main memory is not shown in FIG. 1, but is shown in FIG. 3A by reference numeral 84.) Such operands may represent virtual instructions and data compiled from the user program stored in main memory and also may represent intermediate results generated by processor 10.

It is emphasized that the operands stored in scratch pad memory 15 are not aligned with the boundaries of scratch pad memory 15. Rather, each operand is located such that its least significant bit is located at a bit designated by the 10 bit address field of one of the descriptors fetched from descriptor memory 13, while the remaining bits of the subject operand are located in the consecutive locations from the boundary bit such that the total number of bits of the subject operand are equal to the number specified by the length field of the fetched descriptor. The format of the contents of scratch pad memory 15 is shown by reference numeral 184 in FIG. 2. The position of "J" operand 186 in scratch pad memory 15 is indicated by lines 170 and 172. Line 170 indicates that the least significant bit of "J" operand 186 is located at the bit of scratch pad memory 15 defined in ten bit address field 164 of "J" descriptor 162. The total number of consecutive bits constituting "J" operand 186 and beginning with its least significant bit is specified by five bit length field 168 of "J" descriptor 162. The bit defined by ten bit address field 164 is referred to hereinafter as the "boundary bit" of the subject operand. (Of course, the hardware could be configured so that the most significant bit, rather than the least significant bit, of the operand is the boundary bit). The position of "K" operand 188 in scratch pad memory 15 is indicated by lines 180 and 182. Line 180 indicates that the least significant bit of "K" operand is located at the bit of scratch pad memory 15 defined by ten bit address field 176 of "K" descriptor 174. The total number of consecutive bits constituting "K" operand 188 and beginning with its least significant bit is specified by five bit length field 178 of "K" descriptor 174. The bit defined by ten bit address field 176 is referred to hereinafter as the "boundary bit" of the subject operand.

The "J" and "K" operands simultaneously fetched and presented at the outputs of scratch pad memory 15 are automatically aligned by rotators 86 and 88 of FIG. 3A so that they are compatible with the inputs of arithmetic and logic unit 17, as described hereinafter. No additional firmware instructions need be executed to perform shifting and/or masking steps to accomplish this alignment. This is an important advantage of this invention. As will be explained in more detail, arithmetic and logic unit 17 performs an arithmetic or logic operation involving a "J" operand and a "K" operand and stores the result of such operation in the location of the scratch pad memory 15 in which the "J" operand was initially stored. The result is transferred back to scratch pad memory 15 by means of output bus 20. As can be seen readily from FIG. 1, there are five "J" address lines and five "K" address lines conducting microinstructions from microinstruction storage unit 11 to dual port descriptor memory 13. As is clear from FIGS. 1 and 2, there are sixteen lines for effecting transfer of a "J" descriptor and a "K" descriptor from descriptor memory 13 to dual port scratch pad memory 15. The two selected "J" and "K" operands are simultaneously fetched from dual port scratch pad memory 15 and are each presented, sixteen bits at a time, to the inputs of arithmetic and logic unit 17. If the total operand is more than sixteen bits, each sixteen bit portion thereof and any portion less than sixteen bits are referred to as "partial operands".

A more detailed diagram of processor 10 is shown in FIG. 3, wherein the same reference numerals are used to designate firmware instruction storage unit 11, descriptor memory 13, scratch pad memory 15, and arithmetic and logic unit 17. However, "primes" (') have been added to these reference numerals in FIG. 3 since the correspondence between the above blocks in FIGS. 1 and 3 is approximate rather than exact.

It may be observed from FIGS. 3A and 3B that processor 10 may be generally subdivided into four sections which in a general sense illustrate the basic operation of processor 10. From the bottom of FIGS. 3A and 3B, it may be seen that the four sections include a "fetch microinstruction" section, a "fetch descriptor" section, an "interpret" section and an "execute" section. Each of these sections include, respectively, one of the main system blocks of FIG. 1. Processor 10 functions in essence as a "pipelined" processor wherein during a given machine cycle each of the four main sections performs its basic function on a respective one of four consecutive microinstructions.

The "fetch microinstruction" section of the processor 10 fetches microinstructions from the microinstruction storage unit 11' and places them in instruction register 16. Instruction register 16 is a sixteen bit register having a portion 30 for storing the five bit "J" address field 154 of FIG. 2 and also includes a portion 32 for storing the five bit "K" address field 156 of FIG. 2 and a section 34 for storing the six bit op code field 152. The selected microinstruction is transferred to instruction register 16 by means of group of sixteen conductors represented by reference numeral 28. The microinstructions are initially loaded into microinstruction storage unit 11' from internal transfer subsystem 18, which may include a portion of main memory, or auxiliary storage such as floppy discs, etc. Internal transfer subsystem 18 also includes means for effecting the initial transfer of microinstructions into microinstruction storage unit 11' in response to commands generated by microinstructions in the "control store". (The control store is collectively all of the memory utilized for microinstruction storage.) Information may also be loaded into microinstruction storage unit 11' from output bus 20 and data in register 24. Execution of each virtual instruction is accomplished by loading the proper microinstruction address information into control register 12, which is coupled by means of a group of conductors 22 to address inputs of microinstruction storage unit 11'.

It should be noted that the microinstruction storage or control store unit 11' may be made up of a portion of main memory, a fast storage buffer memory, and/or a cache memory. The microinstruction storage unit must be capable of providing microinstructions to be entered into instruction register 16 at a considerably greater frequency than the frequency of the main memory in which the virtual instruction programs are stored. In the course of executing a single virtual instruction from main memory it may be necessary to execute from several to as many as ten or more microinstructions. Therefore, the microinstruction storage unit must be a high speed memory. For example, if the cycle time of the main memory is 300 nanoseconds, the cycle time of microinstruction storage unit 11' might preferably be approximately 50 nanoseconds.

Once the microinstruction has been fetched and placed into the instruction register 16, the microinstruction is utilized by the "fetch descriptor" section of processor 10 to simultaneously fetch two descriptors, which are referred to as the "J" and "K" descriptors. The fetch descriptor section includes dual port descriptor storage unit 13', which, as explained previously, actually consists of two independently accessible sections of high speed storage. Descriptor storage unit 13' may be implemented by means of registers and associated address circuitry or by means of various types of commercially available high speed random access memories. In some cases it may even be implemented by commercially available read only memories. The "J" address field of the microinstruction is transferred by means of five conductors designated by reference numeral 42 to input registers of one of the two separately addressable sections or parts of descriptor storage memory 13'. The five bits of the "J" address are utilized to select one out of thirty-two words of the first separately addressable portion or part of descriptor storage unit 13'. The sixteen output lines designated by reference numeral 50 constitute the data output lines of the first thirty-two word section of descriptor storage unit 13'. Similarly, five conductors designated by reference numeral 44 transfer the "K" address field of the microinstruction from instruction register 16 to the address inputs of the second thirty-two word section of descriptor storage unit 13' (which contains identical information to the first thirty-two word section). Reference numeral 52 designates sixteen data output conductors thereof. Op code decode circuit 36 decodes the six bit op code from the microinstruction storage instruction register 16 to produce a plurality of control lines 38 which control various transfers of data in the remaining portions of FIG. 3. The control circuitry for decoding microinstruction op codes to control execution of microinstructions is conventional in microprogrammed machines and need not be further described herein. The descriptors may be initially loaded simultaneously into both sections of descriptor storage unit 13' either from a portion of main memory via internal transfer subsystem 18 or from output bus 20 by means of data in register 48. The fetched "J" descriptor is transferred by means of the sixteen lines designated by reference numeral 50 to register 55, which includes a ten bit section 59 for storing the ten bit address field (such as 164 in FIG. 2) of the fetched "J" descriptor. Register 55 also includes a five bit section 57 for storing the length field (see 168 of FIG. 2) of the fetched "J" descriptor. Similarly, the "K" descriptor fetched from descriptor storage unit 13' is transferred by means of the sixteen conductors designated by reference numeral 52 to register 54, which includes a ten bit section 56 for storing the ten bit address field of the "K" descriptor and further includes a five bit section 58 for storing the length field of the "K" descriptor. The two descriptors specified by the "J" and "K" address fields of the microinstruction are essentially simultaneously read out from the descriptor storage unit 13' in a single machine cycle of processor 10.

It may now be seen that addressing of operand locations in scratch pad memory 15' is performed by means of descriptors, according to the present invention. Thirty-two descriptors are stored in duplicate in the two sections of descriptor storage unit 13'. Thirty-two descriptors have been found to be an adequate number of descriptors for interpreting a single typical virtual instruction set, so the size of descriptor memory 13' has been selected at thirty-two words. However, any number of descriptors can be stored "in-line" in the microinstruction storage unit 11' and quickly transferred to descriptor storage unit 13'. Further, various other formats are possible for the descriptors.

The descriptor format shown in FIG. 2 allows specifying operand locations of operands which vary in length from one to thirty-two bits. The boundary bits of operand locations in scratch pad memory 15' may be specified independently of the physical boundaries of scratch pad memory 15'. Other possible formats for specifying a data operand in scratch pad memory 15' include specifying its length as a certain number of bytes plus a certain number (less than eight) of bits. Other bits of the descriptor may be utilized to specify the format (bits or bytes), or the type of data, i.e., signed or unsigned, etc.; such bits may be decoded as op codes. The system may also be designed so that a descriptor position in descriptor storage unit 13' may be loaded with a literal, or a literal may be added to a particular descriptor.

The "interpret" section of the pipeline processor decodes each instruction in response to the signals produced by op code decode circuit 36. The interpret section also fetches operands from the scratch pad memory 15', and prepares processor circuitry for execution of the microinstruction in the "execute" section. The interpret section includes dual port scratch pad memory 15'. As is apparent from the scratch pad field 184 shown in FIG. 2, scratch pad memory 15' may be viewed as a duplicated continuous bit container of 1,024 bits. Scratch pad memory 15' may also be viewed as a 256 byte scratch pad memory if byte addressing rather than bit addressing is utilized. Operands may be loaded into scratch pad memory 15' from main memory 84 in response to microinstructions in the control store. Also, at the completion of the "execute" cycle, the results of the execution operation may be loaded back into the same locations in which the "J" operand was initially stored by means of output bus 20 and data in register 82. The "interpret" section further includes rotators 86 and 88 which are used to properly align the two operands, referred to as the "J" and "K" operands, fetched from the scratch pad memory by means of the "J" and "K" descriptors, respectively. The operation of rotators 86 and 88 will be described subsequently. "J" register 94 is a sixteen bit register having its inputs connected to sixteen output lines designated by reference numeral 90 coupled to the outputs of rotator 86. "J" register 94 is the destination register for the operands indirectly addressed by means of the "J" address fields of the microinstructions and the associated "J" descriptors fetched from the descriptor storage unit 13'. Similarly, sixteen bit "K" register 96 has its sixteen inputs connected to the sixteen outputs of rotator 88 by means of sixteen lines designated by reference numeral 92. The interpret section also includes rotation, iteration and fractional control logic circuitry 70 which decodes the length fields of the "J" and "K" descriptors transferred thereto by groups of conductors 62 and 68. Further detail of logic circuitry 70 is shown in FIG. 4, discussed hereinafter. The remaining bits, if any, in the descriptor words, such as the bit/byte bit mentioned above and bits which designate the type of data, etc., constitute the op codes of the "J" and "K" descriptors. The interpret section also includes conventional logic circuitry, not shown, to decode these op codes. Logic circuitry 70 includes circuitry for controlling the "rotation" operation of the two output buses 78 and 80 of dual port scratch pad memory 15'. Logic circuitry 70 also produces various timing and control signals which are required in the execute section in order to set up the execution section to handle fractional executions for data operands that are narrower than the execution paths or to control iterative executions by the arithmetic and logic unit 17 for operands which are wider than the sixteen bit wide execution paths, which are designated by reference numerals 99 and 101. Main memory system 84 includes address registers and data registers which are not shown, as they are conventional. Such data registers and address registers are provided to effect reading data into and writing data from main memory. The interpret section also includes hardware to resolve a number of conflict conditions that may occur. The signals produced on the group of conductors designated by reference numeral 72 by logic circuitry 70 controls the alignment of the fetched operands so that they are properly aligned before they are transferred to the "J" and "K" registers 94 and 96. Signals produced on the group of conductors designated by reference numeral 74 control the zero insertion and masking operations which must be performed if the operands are less than sixteen bits wide.

In order to completely understand the structure and operation of dual port scratch pad memory 15', it is necessary to refer to the more detailed diagram thereof shown in FIG. 4, wherein one section or port of dual port scratch pad memory 15' is designated by reference numeral 15". The other port of scratch pad memory 15' of FIG. 3A is substantially similar to the first port thereof. Referring to FIG. 4, it is seen that scratch pad memory 15" includes two independently addressable sections, which may be formed from commercially available addressable registers or random access memories. Scratch pad memory section 132 is designated as an "EVEN RAM" and is a 1024 bit memory which includes thirty-two sixteen bit words having even numbered locations numbers designated by 0, 2, 4, . . . 62. Various commercially available high speed random access memory (RAM) circuits could be utilized to implement scratch pad section 132, including the Motorola MCM 10145 emitter coupled logic (ECL) sixteen word by four bit random access memory. Scratch pad memory 15" further includes an entirely similar scratch pad section 140, which is also a 1024 bit random access memory arranged as thirty-two words of sixteen bits each. This section is designated as the "ODD RAM" section and contains the odd numbered word address locations. Of course, ODD RAM section 140 may also be implemented utilizing the Motorola MCM 10145 sixteen word by four bit ECL random access memory. Five address lines designated by reference numeral 128 are connected between even/odd selector circuit 124 and the address inputs of "EVEN RAM" 132. Similarly, the odd address outputs of even/odd selector circuit 124 are connected to the five address inputs of "ODD RAM" 140.

Scratch pad memory 15" further includes three register/counters 115, 116, and 117. The outputs of register/counters 115 and 116 are provided as inputs to even/odd selector circuit 124. The ten outputs of address section 59 of register 55 in FIG. 3A conduct the "J" descriptor and are connected by means of ten lines designated by reference numeral 60 to the ten inputs of register/counter 115. Adder circuit 118 adds a binary 1 to the ten bit "J" descriptor presented on lines 60, so that initially the contents of register/counter 115 are equal to the "J" descriptor ten bit address field (see 164 of FIG. 2), and the contents of register/counter 116 are equal to the contents of register/counter 115 plus a binary 1.

It should be noted that the circuitry of register/counter circuits 115, 116 and 117 may be readily implemented by those skilled in the art. Preferably they are constructed from high speed LSI register/counter circuits which are readily commercially available, such as the Motorola MC 10136, which is a high speed ECL register/counter. The details of adder circuit 118 are straight forward; this circuit can be implemented by means of a number of Motorola MC 10181 ECL adder circuits, which is a high speed arithmetic logic unit capable of peforming sixteen logic operations and sixteen arithmetic operations on two four bit words. The Motorola MC 10136 utilized to implement register/counters 115, 116, and 117 is a high speed synchronized counter which can count up, down, preset, or stop count. The MCM 10145 mentioned above is a high speed ECL sixty-four bit register file RAM with fully decoded inputs. It may be seen that the "J" address field of the "J" descriptor is capable of selecting one of the total of 1024 bits stored in "EVEN RAM" 132 and "ODD RAM" 140 combined. Each of the "EVEN" and "ODD" RAMS 132 and 140 are divided into thirty-two words, or "containers" of sixteen bits each. The least significant five bits of the "J" address field stored in register/counter 115 are utilized to select one of the thirty-two "containers" of either "EVEN RAM" 132 or "ODD RAM" 140, depending on whether the least significant five bits happen to be equal to an even or an odd binary number. If the least significant five bits happen to be an even number, then even/odd selector circuit 124 electrically couples the least significant five bits of the "J" address field onto conductors 128, and one of the thirty-two "containers" or words of "EVEN RAM" 132 is selected, and the contents of each bit of the selected "container", or word, will be presented on the respective sixteen output conductors designated by reference numeral 78A. If the least significant five bits in register/counter 115 are even, the least significant five bits of register/counter 116 are necessarily odd. The latter least significant five bits are gated by means of even/odd selector circuit 124 and five conductors 130 to the address inputs of "ODD RAM" 140, so that one of the thirty-two words or "containers" thereof are selected, presenting the contents of the sixteen bits of the selected container on the sixteen conductors represented by reference numeral 78B. Thus, thirty-two consecutive bits in scratch pad memory part 15'' are presented on the thirty-two conductors represented by reference numerals 78A and 78B. The sixteen bit operand defined by the "J" descriptor or a partial operand thereof necessarily is contained within these thirty-two bits, and are ready to be aligned by rotator 86 so as to be compatible with the circuitry of the "execution" section. Conversely, if the least significant five bits of counter/register 115 are an odd number, they will be gated by means of even/odd selector circuit 124 to the address input of "ODD RAM" 140, while the least significant five bits of counter/register 116 will be gated to the address inputs of "EVEN RAM" 132.

The most significant five bits of the "J" address field stored in register/counter 115 are transferred by means of five conductors in the group of conductors designated by reference numeral 121 to decode and control circuitry 70' which is partially included within logic circuitry 70 of FIG. 3. The most significant five bits of the "J" address field are utilized to select one of the sixteen bits in one of the selected "containers" or words in "EVEN RAM" 132 or "ODD RAM" 140. This selected bit is the previously described "boundary bit" of the desired operand stored in the scratch pad memory. The selection of the boundary bit is accomplished by means of the decode and control circuitry 70' and rotator circuitry 86. Rotator circuitry 86 includes sixteen bits of each of which is implemented by a sixteen-to-one multiplexer circuit. The multiplexer circuits may be readily implemented by utilizing the Motorola MC 10164 multiplexer. The signals provided on the conductors designated by reference numeral 72 provide selection codes for controlling which of the sixteen inputs of each of the sixteen mulitplexers is gated to the respective outputs thereof.

Each sixteen bit multiplexer has four inputs for receiving a four bit input code which selects which of the sixteen inputs is gated to the one output of that multiplexer. The first sixteen bit multiplexer has its sixteen inputs connected to the first through the sixteenth output bits, respectively, of "EVEN RAM" 132. The second sixteen bit multiplexer has its sixteen inputs connected, respectively, to the second through the sixteenth bits of "EVEN RAM" 132 and the first bit of "ODD RAM" 140. The third sixteen bit multiplexer has its sixteen inputs connected, respectively, to the third through the sixteenth bits output bits of "EVEN RAM" 132 and the first and second bits of "ODD RAM" 140. The thirteen remaining sixteen bit multiplexers are similarly connected beginning with increasing ones of the outputs of "EVEN RAM" 132, until finally the last sixteen bit multiplexer has all of its sixteen inputs connected to the sixteen outputs, respectively, of "ODD RAM" 140. The sixteen outputs, one corresponding to each of the multiplexers, constitute the sixteen outputs of rotator 86 represented by reference numeral 90.

The control inputs for the sixteen bit multiplexers are produced by a read only memory in decoding control circuitry 70' which decodes the most significant five bits of the "J" descriptor address field to obtain the boundary bit of the operands to be fetched from the scratch pad memory. The pattern stored in the read only memory further produces signals which gate the sequentially adjacent sixteen bits constituting the addressed operand or partial operand on conductors 78A and 78B to the respective multiplexer outputs coupled to output conductors 90. If the operand to be fetched is longer than sixteen bits, register/counter 117, which initially stores the "J" descriptor length field is decremented by sixteen, and register/counter registers 115 and 116 are each incremented by one to present the next adjacent thirty-two bits of the bit addressable scratch pad memory on the conductors represented by reference numerals 78A and 78B. The appropriate control signals from the conductors represented by reference numeral 72 are again presented to the control inputs of the multiplexers, so that the additional bits of the operand appear on rotator output conductors 90.

The "J" descriptor length field is also decoded by logic circuitry 70' to automatically control the zero insertion and masking functions which must be performed for operands or partial operands which are less than sixteen bits in length.

Referring back to FIG. 3, the "execute" section completes the processing of the microinstruction. Arithmetic and logic functions are performed in this section. The output bus 20 is the major data path from the execution units to the scratch pad memory and to the fetch sections. The execution section consists mainly of arithmetic and logic unit (ALU) 17', and also includes zero insert and sign extend circuits 102 and 104, a rotator 110, and a carry-save circuit 112. The execution unit can perform arithmetic, logic, compare, move, etc., operations on signed or unsigned binary operands, BCD coded operands, and byte (ASC II) operands. The sources of data to the arithmetic and logic unit 17' are the "J" register 94 and "K" register 96. Rotator 110 responds to control circuitry 70 in much the same fashion as rotator 86 of FIG. 4 to align the data resulting from the operation by the ALU before it is stored back into the scratch pad memory location occupied by the "J" operand. Controls are set up by the control logic 70 and by means of zero insert and sign extend circuits 102 and 104 and circuitry 70 to allow execution of operands longer or shorter than the width of the ALU, which is sixteen bits. The zero insert and sign extend circuitry 102 and 104 operates to insert leading "zeros" into all bits of the ALU corresponding to the difference between widths of ALU (sixteen bits) and the width of the subject operand. In the case of a negative operand expressed in signal arithmetic, the zero insert and sign extend circuitry 102 and 104 also operates to "extend the sign" by inserting "ones" into the above-mentioned bits of the ALU. The ALU is capable of handling fractional and iterative operations, so that it is seen that execution times will vary depending on the length of the operand. The ALU performs straight-forward sixteen bit arithmetic operations. The carry is saved in a carry-save flip-flop so that it can be inputted to the ALU on a subsequent iteration.

Since processor 10 is physically divided into four separately clocked sections, up to four microinstructions may be operated on in parallel or pipeline fashion. An example of microinstruction flow is illustrated in TABLE 1 for the following sample program:

area of interpreting virtual instruction sets or in the area of emulating foreign processors. The structural hardware elements which permit achievement of the above improved results include the descriptor-addressed scratch pad memory and the rotator and associated control circuitry which automatically aligns the operands fetched from the scratch pad memory to the ALU, which is capable of fractional and iterative operations. The elements in the interpret and execute sections cooperate to achieve iterative operations on operands longer than the machine data paths. The scratch pad memory in essence operates as a bit addressable continuous bit container with no internal hardware-limited word or operand boundaries. According to the present invention, variable length operands, including virtual instructions with variable length op codes and variable length data fields within the variable length operands are easily written into and read out of the bit addressable scratch pad memory under control of interpretive firmware subroutines stored in high speed firmware memories. Various fields of varying lengths within a virtual instruction or data field may be isolated and stored in different locations within the bit addressable scratch pad memory. Of course, the bit-addressable scratch pad memory also performs the usual scratch pad memory

TABLE 1

| Clock Time Period | Fetch Microinstruction | Fetch Descriptor | Interpret | Execute |
|---|---|---|---|---|
| 1 | Read ADD microinstruction from microinstruction Storage Memory | Previous instruction | Previous instruction | Previous instruction |
| 2 | No change | Read J & K Descriptors for ADD | Previous instruction | Previous instruction |
| 3 | Read SUB microinstruction from microinstruction Storage Memory | No change | For ADD read 1st 16 bits of J & K data & rotate to align. | Previous instruction |
| 4 | Move | Read J & K Descriptors For SUB | For ADD read 2nd 16 bits contaning rest of J & K data & rotate to align. | ADD J & K data & rotate result. Save carry |
| 5 | Read next microinstruction from microinstruction storage memory | Move | Write 1st 16 bits of ADD J & K Data. Read J & K Data for SUB | Insert zeros to make K and J data equal length. ADD rest of rotate result |
| 6 | | | Write rest of ADD Move | Insert zeros, Mask and SUBTRACT and rotate result |
| 7 | | | Write SUB Data Etc. | Move |

```
              ADD    R1 + R2  R1
              SUB    R3 − R4  R3
              MOVE
       where  R1 is a 23 bit "J" operand
              R2 is a 20 bit "K" operand
              R3 is a 5 bit "J" operand
              R4 is a 5 bit "K" operand
```

To summarize, the present invention provides a microprogrammed processor subsystem which is capable of interpreting multiple virtual programming languages more efficiently than known processors. This desirable result is achieved because the processor of the invention has a structure which permits analyzing and interpreting virtual instructions utilizing simpler and shorter microinstruction subroutines than has been possible with known microprogrammed processors having roughly comparable data processing capability in the functions of functioning as a very high speed random access memory for storing intermediate computational results and contents of various registers during interrupts. The bit addressable scratch pad memory is loaded with virtual instructions and data from the main user program in response to execution of microinstructions in the control store. Microinstructions from the interpretive firmware subroutines indirectly address the bit addressable scratch pad memory by means of the intermediate descriptor memory from which descriptors are fetched. Each microinstruction includes an op code which is decoded to effect execution of the microinstruction. Each microinstruction also includes a pair of address fields which are utilized to indirectly address the scratch pad memory by fetching two descriptors from the descriptor memory. The two descriptors contain the addresses of the variable length operands in the bit addressable scratch pad memory. The format of the descriptors is such that each descriptor contains an address field which defines the least significant bit of the addressed operand. Each descriptor also contains a length field which defines how many consecutive bits sequentially adjacent to the least significant bit must be addressed to accomplish fetching of the complete variable length operand from the scratch pad memory. The operands fetched from the bit addressable scratch pad memory are automatically aligned to the arithmetic and logic unit inputs by control circuitry which decodes the descriptor address fields and length fields and generates control signals which in turn control rotator circuits which accomplish the desired alignment. The aligned operands are then operated upon by a sixteen bit arithmetic and logic unit which is capable of interational computation operations for aligned operands or partial operands which are longer than sixteen bits. The arithmetic and logic unit is also capable of fractional computations and operations for aligned operands or partial operands which are less than sixteen bits in length. In order to simultaneously present two separate variable length operands to the arithmetic and logic unit, a dual port bit addressable scratch pad memory is utilized. The dual port scratch pad memory includes two simultaneously accessible bit-addressable portions. The microinstructions each include two relatively short address fields which are utilized to simultaneously address two descriptors stored in the descriptor memory, which is also a dual port memory. Thus, two descriptors are simultaneously fetched and used to simultaneously fetch the two desired variable length operands in the bit addressable scratch pad memory.

The structure of the hardware of the processor described herein differs substantially from that of prior microprogrammed processors by provision of a bit-addressable scratch pad memory system into which operands having variable length fields of virtual instructions and variable length data fields may be written. The disclosed processor also differs from the known art by the provision of an automatic rotation or alignment system which receives the fetched variable length operands from the bit-addressable scratch pad memory and decodes the address field and length field of the descriptor to automatically rotate the operands and partial operands so that they are properly aligned with the fixed width arithmetic and logic unit. the locations of the bit-addressable scratch pad memory into which the various bits of the variable length fields are written are determined by the address field and length field of the descriptor independently of the widths of the bit-addressable scratch pad memory and the widths of the various data paths in the processor.

The above differences of the discussed invention over the known microprogrammed processors permit more efficient operation of the inventive data processing system, because for the prior machines, such as the one described in the above-mentioned Packard patent, it is necessary for the processor interpretive firmware to carry out multiple shifting operations on variable length operands or to carry out masking operations on them and to perform carry save operations and iterations on them in order to properly align them to be compatible with the fixed width data paths, etc. The necessity of utilizing microinstruction subroutines in the known machines to perform such shifting or masking operations on every operand or field of an instruction or data field which is different in length from the widths of the fixed registers, data paths, and, execution paths before it could be executed put a tremendous burden on the firmware programmer, which burden is avoided by the present processor. Also, the additional firmware loops required for carry save operations and iterative operations on long operands also increased the burden on the firmware programmer. The firmware programmer for the known processors not only has to focus his attention on solving the main virtual instruction interpretation problems for each virtual instruction of a number of virtual instructions sets for known prior art processors, he also has to focus a great deal of attention on the problem of efficiently manipulating each of the variable length operands to make it compatible with the fixed width processor hardware. As a result, firmware programs for prior art machines are inevitably substantially longer than those required by the processor of the present invention. Consequently, larger, more expensive high speed firmware memories are needed to store the firmware programs for the prior processors then for the present processor.

It is well known that a substantial part of the total cost of developing a microprogrammed data processing system is the cost of the firmware developement effort and the cost of the high speed memory required to store the firmware. However, according to the invention, the bit-addressable scratch pad memory in combination with the automatic rotator alignment system described herein relieves the above-described burden from the firmware programmer. Further, the length of the interpretive firmware program is substantially reduced. This in turn substantially reduces the amount of expensive firmware memory required by the system. The overall system development cost may be thereby substantially reduced, depending on how incompatible the virtual instruction sets are with the data paths in the processor. Consequently, the cost of the final product is reduced, even though the hardware costs are somewhat increased for duplicated memory circuitry for the dual port memories and the rotator circuitry and associated central circuitry. Further, the number of processor cycles required to execute a particular virtual instruction is reduced as a result of the elimination of a large number of shifting and masking operations saved by the new combination. The operating speed of the overall system is thereby increased. This ultimately reduces the overall cost of data processing to the ultimate user.

We claim:

1. A microprogrammed processor for processing variable length operands and including a microinstruction memory, the processor comprising:
  (a) first memory means in the microinstruction memory for storing a descriptor having a length field and an address field thereof;
  (b) scratch pad memory means for storing a plurality of variable length operands;
  (c) an N-bit arithmetic and logic means for performing arithmetic and logic operations on groups of N bits and on groups of less than N bits;

(d) means responsive to said first memory means and to the microinstruction memory for fetching an operand having a boundary bit location defined by the address field and a number of bits defined by the length field from said scratch pad memory means; and (e) means responsive to said first memory means and to said scratch pad memory means for aligning the groups of N bits and said groups of less than N bits to the inputs of said N-bit arithmetic and logic means in response to the address field.

2. A microprogrammed processor for processing variable length operands and including a microinstruction memory, the processor comprising:

(a) first memory means in the microinstruction memory for storing first and second descriptors each having a length field and an address field thereof;

(b) scratch pad memory means for storing a plurality of variable length operands;

(c) an N-bit arithmetic and logic means for performing arithmetic and logic operations on groups of N bits and on groups of less than N bits;

(d) means responsive to said first memory means and to the microinstruction memory for fetching first and second operands having boundary bit locations defined by the address fields of the first and second descriptors, respectively, and having numbers of bits defined by the length fields of the first and second descriptors, respectively, from said scratch pad memory means; and (e) means responsive to said first memory means and to said scratch pad memory means for aligning the groups of N bits and said groups of less than N bits to the inputs of said N-bit arithmetic and logic means in response to the address fields of the first and second descriptors, respectively, 3. A method of operating a microprogrammed processor including a microinstruction memory containing a plurality of descriptors, a scratch pad memory containing a plurality of operands of various lengths, and an arithmetic and logic unit, the method comprising the steps of:

(a) fetching a descriptor having an address field and a length field thereof from the microinstruction memory;

(b) fetching an operand having a boundary bit location defined by the address field and a number of bits defined by the length field from the scratch pad memory; and (c) aligning the operand to the inputs of the arithmetic and logic means in response to the address field.

4. A method of operating a microprogrammed processor including a microinstruction memory containing a plurality of descriptors, a scratch pad memory containing a plurality of operands of various lengths, and an arithmetic and logic unit, the method comprising the steps of:

(a) fetching first and second descriptors each having an address field and a length field thereof from the microinstruction memory;

(b) fetching first and second operands having boundary bit locations defined by the address fields of the first and second descriptors, respectively, and having numbers of bits defined by the length fields of the first and second descriptors, respectively, from the scratch pad memory; and (c) aligning the first and second operands to the inputs of the arithmetic and logic means in response to the address fields of the first and second descriptors, respectively.

5. A microprogrammed processor for processing operands of various lengths including a main memory containing a plurality of virtual instructions and further including a microinstruction memory containing a plurality of microinstructions, said processor comprising:

(a) a descriptor memory for storing a plurality of descriptors each containing an address field and a length field;

(b) a bit-addressable scratch pad memory;

(c) means for effecting transferring of operands between said main memory and said bit-addressable scratch pad memory;

(d) means for fetching a microinstruction containing a first field from said microinstruction memory;

(e) means for fetching a first one of said descriptors from a location of said descriptor memory determined by said first field of said microinstruction, said first descriptor containing a first address field and a first length field; and (f) means for accessing a first plurality of consecutive locations in said bit-addressable scratch pad memory in order to read a first operand from said first plurality of locations, wherein one of said first plurality of locations is a boundary bit location determined by said first address field, and wherein the number of said first plurality of locations is determined by said first length field.

6. The microprogrammed processor of Claim 5 wherein:

(a) said microinstruction contains a second field;

(b) said descriptor memory is a dual port memory which includes first and second sections, and wherein said first and second fields of said microinstruction define locations in said first and second sections, respectively;

(c) said processor includes means for fetching a second one of said descriptors from a location of said descriptor memory determined by said second field of said microinstruction, and wherein said second descriptor contains a second address field and a second length field;

(d) said bit-addressable scratch pad memory is also a dual port memory which includes first and second sections, and wherein said first address and first length fields and said second address and second length fields define operand locations in said first and second sections of said bit-addressable scratch pad memory, respectively;

(e) said first plurality of locations are located in said first section of said bit-addressable scratch pad memory; and (f) said processor includes means for accessing a second plurality of consecutive locations in said second section of said bit-addressable scratch pad memory in order to read a second operand out of said second plurality of locations, wherein one of said second plurality of locations is a boundary bit location determined by said second address field, and wherein the number of said second plurality of locations is determined by said second length field.

7. The microprogrammed processor of claim 6 wherein said boundary bit locations are least significant bit locations of said first plurality of locations and of said second plurality of locations.

8. The microprogrammed processor of claim 6 further comprising:

(a) means responsive to said bit-addressable scratch pad memory for performing an arithmetic or logic operation on said first operand, said arithmetic and logic means having a plurality of consecutively ordered inputs; and (b) means responsive to said first address field and to said first length field for aligning said first operand by selectively gating consecutive bits of said first operand to respective consecutive ones of said inputs of said arithmetic and logic means beginning with said boundary bit and a first one of said consecutive inputs.

9. The microprogrammed processor of claim 8 wherein:

(a) said first and second sections of said descriptor memory each contain thirty-two locations for storing the same thirty-two descriptors, and said first and second fields of said microinstruction each includes five bits;

(b) said first and second sections of said bit-addressable scratch pad memory each contain 1024 bit locations for storing identical information, said first and second address fields each contain ten bits, and said first and second length fields each contain five bits; and (c) said arithmetic and logic means has sixteen of said inputs.

10. The processor of claim 8 wherein:

(a) said first section of said scratch pad memory includes X words of Y bits each, and is divided into an even section which contains even numbered words and an odd section which contains odd numbered words, X and Y being integers;

(b) means responsive to a group of bits of said first address field for selecting a Y bit word from one of said even section and said odd section, and for selecting an adjacent Y bit word from the other of said even and odd sections, thereby presenting 2Y bits of information at Y outputs of said even section and at Y outputs of said odd section; and (c) said aligning means further includes Y multiplexor logic circuits each having an output and each having Y consecutively ordered inputs, various ones of said inputs of said multiplexor circuits being connected to various ones of said 2Y outputs in order to effect gating of Y consecutive ones of said 2Y bits of information beginning with said boundary bit of said first operand to said Y consecutive inputs of said arithmetic and logic means.

11. The processor of claim 10 wherein said multiplexor logic circuits each include a plurality of control inputs for selecting which of said Y inputs is gated to said output of each of said multiplexor logic circuits.

12. The processor of claim 11 wherein said aligning means further includes control means responsive to said first address field and to said first length field for producing said plurality of control signals.

13. The processor of claim 10 further including means for gating said group of bits of said first address field to said even section of said scratch pad memory to effect said selecting of one of said even numbered words if said group of bits is even, and for gating said group of bits to said odd section to effect selecting of one of said odd numbered words if said group of bits is odd.

14. The processor of claim 10 wherein said even and odd sections of said scratch pad memory each include separately accessable random access memories arranged as X words of Y bits each.

15. The processor of claim 13 further including a first counter responsive to said first section of said descriptor memory for receiving said first address field and for incrementing said group of bits of said first address field by unity to effect addressing an adjacently numbered word in order to effect an iterative operation by said arithmetic and logic means upon said first operand if said first operand is more than Y bits in length.

16. The processor of claim 13 further including second counter means responsive to said first length field for temporarily storing said first length field and for decrementing its contents by Y in order to effect said iterative operation by said arithmetic and logic unit.

17. The processor claim 10 further including means responsive to said first address field and to said first length field and coupled between said multiplexor outputs and said inputs of said arithmetic and logic means for inserting zeros into selected bits of said first operand.

18. The processor of claim 10 further including means responsive to said first address field and to said first length field and coupled between said multiplexor outputs for masking selected bits of said first operand from said arithmetic and logic means.

19. The processor of claim 4 wherein said microinstruction memory, said descriptor memory, said bit-addressable scratch pad memory, and said arithmetic and logic means are sequentially clocked in order to permit pilelined processing of up to four microinstructions.

20. The processor of claim 1 wherein said microinstructions are arranged to form an interpretive program for interpreting said virtual instructions and accordingly controlling the hardware of said processor.

21. A processor for efficiently processing variable length operands comprising:

(a) a main memory containing operands in the form of virtual instructions and data;

(b) an arithmetic and logic unit having a plurality of inputs;

(c) a microinstruction memory containing microinstructions, each of which contain an op code and first and second address fields;

(d) a dual port descriptor memory for containing a plurality of descriptors each containing an address field and a length field, said first and second ports of said descriptor memory being accessible by means of said first and second address fields of said microinstructions, respectively;

(e) a dual port scratch memory for containing a plurality of variable length operands, said first operand having a boundary bit location and a total number of bits thereof defined by said first address field and said first length field, respectively, said second operand having a boundary bit location and a total number of bits thereof defined by said second address field and said second length field, respectively;

(f) means for transferring first and second ones of said operands from said main memory into said first and second ports of said scratch pad memory, respectively;

(g) means for fetching one of said microinstructions from said microinstruction memory;

(h) means for utilizing said first and second fields of said fetched microinstruction, respectively, to access first and second locations of said descriptor memory to fetch first and second ones of said descriptors;

(i) means for utilizing said first and second descriptors, respectively, to access said first and second ports of said scratch pad memory to fetch said first and second operands; and (j) means for utilizing said first address and first length fields to align said first fetched operand to a first group of said inputs of said arithmetic and logic unit and for utilizing said second address and second length fields to align said second fetched operand to a second group of said inputs of said arithmetic and logic unit.

22. The processor of claim 21 wherein:

(a) said arithmetic and logic unit includes a plurality of outputs at which the results of an operation upon said first and second operands by said arithmetic and logic unit are presented;

(b) means for utilizing said first address and length fields to align said result at said outputs of said arithmetic and logic unit and for effecting transfer of said aligned results into the same location of said first port of said scratch pad memory from which said first operand was previously fetched.

23. An improved processor for processing variable length operands comprising, in combination:

(a) memory means for storing a main program of instructions and data fields, wherein said instructions and data fields associated with said instructions may be of different length than data paths in said processor;

(b) scratch pad memory means for storing variable length operands;

(c) descriptor storage means for storing a plurality of descriptors, wherein each of said descriptors includes an address field which defines a boundary bit of an operand in said scratch pad memory means and further includes a length field which defines the length of said operand;

(d) means for storing a plurality of microinstructions which each include first and second descriptor address fields;

(e) control means responsive to said main program instructions and to said microinstructions for controlling transfers of digital data in said processor;

(f) means responsive to said control means for accessing said microinstruction storage means to obtain one of said microinstructions;

(g) means responsive to said control means and to said microinstruction storage means for effecting accessing two locations in said descriptor storage means determined by said first and second descriptor address fields, respectively;

(h) means responsive to said control means and to said descriptor storage means for effecting accessing first and second operands in said scratch pad memory, wherein the location of a boundary bit of said first operand is determined by said first descriptor address field, the length of said first operand is determined by said first length field, the location of a boundary bit of said second operand is determined by said second descriptor address field, and the length of said second operand is determined by said second length field; and (i) means for performing an arithmetic or logic operation upon said first and second operands.

24. A method of operating a processor to efficiently process variable length operands, said processor including a main memory, a scratch pad memory, a microinstruction memory, and an arithmetic and logic unit, said method comprising the steps of:

(a) transferring data from said main memory into said scratch pad memory;

(b) reading a location of a firmware memory to obtain a firmware instruction which includes an operation code and first and second address fields;

(c) utilizing said first and second address fields, respectively, to read first and second locations of a descriptor memory to obtain first and second descriptors, said first descriptor including a third address field and a first length field, and said second descriptor containing a fourth address field and a second length field;

(d) utilizing said third and fourth address fields, respectively, to fetch first and second operands having least significant bits at addresses defined by said third and fourth address fields respectively, and also having lengths defined by said first and second length fields, respectively from said scratch pad memory; and (e) performing an arithmetic or logic operation on said first and second operands.

25. The method of claim 24 further including the step of aligning said first and second operands to the inputs of said arithmetic and logic unit prior to step (e).

26. The method of claim 25 further including the steps of:

(a) truncating the result of said arithmetic or logic operation to a number of bits defined by said first length field; and (b) storing said truncated result in said scratch pad memory at the locations thereof from which said first operand was fetched.

* * * * *